Jan. 15, 1929. 1,699,173
C. R. WHITTEMORE
PROCESS OF PRODUCING TITANIUM OXIDE FROM TITANIFEROUS IRON ORES
Filed Aug. 21, 1924
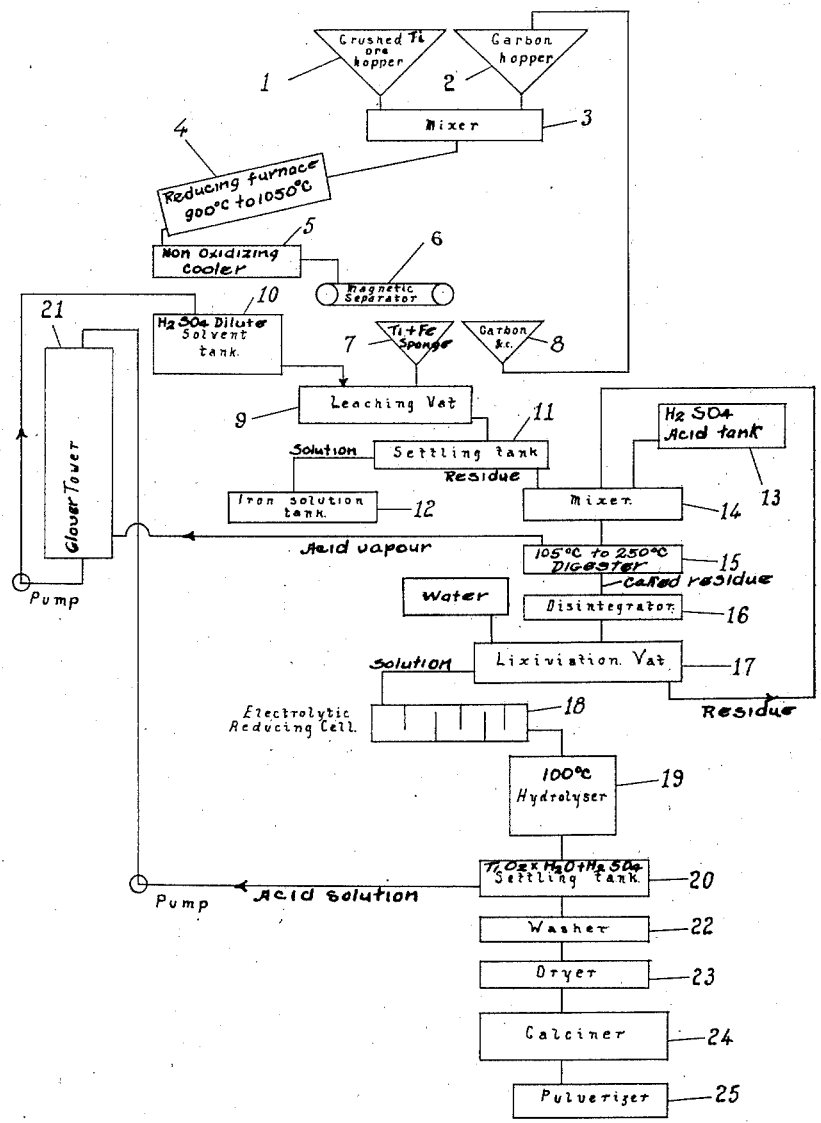
INVENTOR
CARL RAYMOND WHITTEMORE
By
ATTORNEY Patented Jan. 15, 1929.

1,699,173

UNITED STATES PATENT OFFICE.

CARL RAYMOND WHITTEMORE, OF MONTREAL, QUEBEC, CANADA.

PROCESS OF PRODUCING TITANIUM OXIDE FROM TITANIFEROUS IRON ORES.

Application filed August 21, 1924. Serial No. 733,349.

This invention relates to improvements in the process of obtaining titanium oxide from titaniferous iron ores.

The object of my invention is to provide a method of treatment of such ores whereby the titanium content is separated from the other contents of the ores, more completely and with greater facility and economy than hitherto.

The method comprises a series of steps, and also certain cyclic processes whereby the quantity of reagents required is greatly reduced, and the separation more complete.

Reference is made to the accompanying drawing which discloses a diagram of the means for carrying out the process as described hereinafter.

The ore to be treated is first reduced to a fine powder and preferably dressed to remove superfluous gangue matter.

It is then mixed with a suitable proportion of carbon. I have found that from 25% to 33% of crushed charcoal is sufficient.

The mixture is then treated in a reducing furnace at a temperature of from about 900° C. to about 1050° C. until the iron content has been converted into iron sponge. Any fusion or sintering of the mixture must be specially avoided.

The reduction of the iron content to sponge may be carried out by other suitable methods which obtain the same result.

The resultant product should be in a finely divided condition and not require further grinding.

After being cooled in a non-oxidizing atmosphere, the mixture is then passed through a magnetic separator or similar apparatus to remove any residual carbon, ash, or gangue before it reaches the leaching vats.

The titanium content is carried by the iron sponge in this separation as the intimate association of the iron and titanium is not altered sufficiently in the furnace treatment to effect this separation.

The residual carbon may be added to the original supply.

The reduced ore is then leached with an iron solvent to remove the greater proportion of the iron but to leave practically all the titanium in the residue. For this purpose I employ dilute sulphuric acid (10%) as a suitable solvent but this may be replaced by other solvents such as hydrochloric acid or ferric chloride.

After the leaching the contents of the vats are allowed to settle in suitable settling tanks and the liquid portion is then removed leaving a residue containing titanium content and a small percentage of iron.

The solution may be treated to recover the iron by electrolysis as described in my Patent application Serial Number 728,710. filed 28th July 1924, or by other methods.

The residue is mixed with a quantity of concentrated sulphuric acid and fed into a digestor. I have found that about 1.50 to 1.80 by weight of acid to one part by weight of the residue sufficient but the amount may vary somewhat according to the ore being treated.

The temperature of the digestor is raised to from about 150° C. to 250° C.

The acid vapours may be drawn off and fed up through a tower where they are dissolved in the acid solution resulting from the hydrolysis (described below) which flows down and is collected for use in the leaching vat as above set forth.

The sulphated mass which remains will contain the titanium content in the form of normal and basic sulphates.

The sulphated mass is then broken up in a disintegrator and placed in a lixiviation vat with cold water. The greater proportion of the titanium content dissolves out leaving a residue which may be returned to the digestor for further treatment or may be treated separately to remove the balance of the titanium content.

The solution is drawn off from the vat and submitted to electrolytic reduction to reduce the ferric iron to the ferrous state.

After this reduction an extender may be added to the solution such as barium sulphate ($BaSO_4$).

The solution or mixture is then placed in a covered vessel and heated to 100° C. for from one to two hours and the titanium hydroxide is precipitated.

The solution after hydrolysis contains dilute sulphuric acid according to the formula $$Ti(SO_4)_2 \cdot XH_2O = TiO_2 \cdot XH_2O + 2H_2SO_4$$

The contents of the vessel are allowed to settle in a settling tank. The liquid portion is then drawn off and fed to the top of the tower of the Glover type, as described above.

The precipitate is then washed, dried and afterwards calcined. The calcined product is pulverized.

Referring to the diagram the hopper 1, contains the crushed ore, the hopper 2, contains crushed charcoal, the proper proportions of these materials are mixed in the mixer 3, and then treated in the reduction furnace 4, at the proper temperature and for the necessary time.

The treated ore is then cooled in a non-oxidizing atmosphere in the cooler 5, to prevent re-oxidization of the iron sponge.

It is then passed through the magnetic separator 6, the metallic portion being carried into the hopper 7, while the residual carbon is thrown into the hopper 8. The residual carbon may be carried back to the hopper 2, to be used with fresh ore.

The contents of the hopper 7, are then fed into the leaching vat 9, and the iron solvent from the tank 10, is added in suitable quantity. When the leaching is completed the contents of the leaching vat 9, are fed into a settling tank 11.

The solution is drawn off into the container 12, and may be treated for the recovery of the iron therein.

The residue in the settling tank 11, is passed into the mixer 14, and the acid from the tank 13, is added. After thorough mixing the contents are fed into the digester 15. The digester 15, is then closed and its temperature raised the necessary amount.

The vapours arising from the heated acid are drawn off from the digester 15, and fed to the bottom of the tower 21, through which they pass upwards.

The digested mass remaining will be found to be caked and it is therefore passed through a disintegrator 16, to break it up. Whereupon it is placed in the lixiviating vat 17. Cold water is added to dissolve out the soluble matter. The solution thus formed is passed through the electrolytic reducing cell 18, and after the required reduction, is fed into the hydrolyzer 19.

Means to heat the hydrolyzer 19, to the necessary temperature are provided.

The solution is treated in the hydrolyzer 19, till practically all the titanium content is precipitated.

The hydrolyzer 19, is then emptied into a settling tank 20. After settling, the liquid portion is drawn off and pumped to the top of the tower 21, to percolate downwards therein. Having reached the bottom of the tower, the enriched solution is pumped into the solvent tank 10.

The residue in the settling tank 20, is then washed in the washer 22, and dried in the dryer 23.

The dried material is calcined in a calcining furnace 24, after which it passes through a pulverizer 25.

I have found that when titaniferous iron ores are treated to convert the iron content into iron sponge that the effect of the solvent is greater and more thorough than by the methods hitherto adopted.

A much larger proportion of the iron content is thereby eliminated from the titanium residue and as a consequence less current is required in the electrolytic reduction of the ferric iron to ferrous iron before hydrolysis.

Furthermore the volume of solution to be hydrolyzed can be greatly reduced owing to the small amount of iron present, without affecting the high extraction of the titanium oxide. This reduction in volume would also apply to the amount of water required for washing the precipitated titanium oxide.

Great economy in the size of the plant and in the requirements such as steam, electric current and water supply, is secured.

What I claim is:—

1. The process of preparing titanium oxide from titaniferous iron ores which comprises reducing the iron content to iron sponge without fusion or sintering, cooling in a non-oxidizing atmosphere and separating the sponge and titanium content from the non-magnetic portion, dissolving the treated ore with a solvent, separating the residue, heating the residue with an acid to 250° C. in a digester to form titanium salts, lixiviating the mass with cold water after its having been disintegrated, reducing the solution by electrolysis to convert the ferric salts to ferrous salts, hydrolyzing the solution to precipitate titanium hydroxide, separating the precipitate from the solution, and calcining the precipitate.

2. The process of preparing titanium oxide from titaniferous iron ores which comprises reducing the iron content to iron sponge without fusion or sintering, cooling in a non-oxidizing atmosphere and separating the sponge and titanium content from the non-magnetic portion, dissolving the treated ore with a solvent, separating the residue, heating the residue with an acid to 250° C. in a digester to form titanium salts, withdrawing the acid vapours, lixiviating the mass with cold water after its having been disintegrated, hydrolyzing the solution to precipitate titanium hydroxide, separating the precipitate from the solution, dissolving the acid vapours in the solution, adding the solution to the sponge solvent, and calcining the precipitate.

3. The process of preparing titanium oxide from titaniferous iron ores which comprises comminuting the ore, mixing the powdered ore with from about 25% to 33% of carbon, reducing the mixture at a temperature of from about 900° C. to about 1050° C. to convert the iron into sponge, cooling the treated ore in a non-oxidizing atmosphere, separating the non-magnetic portion from the sponge and titanium content, leaching the ore with an iron solvent, separating the solution from the residue, heating the residue with a concentrated acid to 250° C. in a digester to form titanium salts, lixiviating the mass with cold water after its having been disintegrated, hydrolyzing the solution of the salts to precipitate titanium hydroxide, separating the precipitate from the solution and calcining the precipitate.

4. The process of preparing titanium oxide from titaniferous iron ores which comprises treating the ore with a reducing agent until the iron is converted into iron sponge without fusion or sintering, cooling in a non-oxidizing atmosphere and separating the sponge and titanium content from the non-magnetic portion, dissolving the treated ore with a solvent, separating the residue from the solution containing the iron, heating the residue together with concentrated sulphuric acid to 250° C. in a digester to form titanium sulphates, lixiviating the mass with cold water after its having been disintegrated, hydrolyzing the solution to precipitate titanium hydroxide, separating the precipitate from the solution and calcining the precipitate.

5. The process of preparing titanium oxide from titaniferous iron ores which comprises treating the ore with a reducing agent until the iron is converted into iron sponge without fusion or sintering, cooling in a non-oxidizing atmosphere and separating the sponge and titanium content from the non-magnetic portion, dissolving the treated ore with a solvent, separating the residue from the solution containing the iron, heating the residue together with concentrated sulphuric acid to 250° C. in a digester to form titanium sulphates, withdrawing the acid vapours, lixiviating the mass with cold water after its having been disintegrated, hydrolyzing the solution to precipitate titanium hydroxide, separating the precipitate from the solution, dissolving the acid vapours in the solution, adding the solution to the solvent of the iron sponge, washing the precipitate and calcining the precipitate.

6. The process of preparing titanium oxide from titaniferous iron ores which comprises reducing the iron content to iron sponge without fusion or sintering, cooling in a non-oxidizing atmosphere and separating the sponge and titanium content from the non-magnetic portion, dissolving the treated ore with a solvent, separating the residue, heating the residue with an acid to 250° C. in a digester to form titanium salts, lixiviating the mass with cold water after its having been disintegrated, hydrolyzing the solution to precipitate titanium hydroxide, separating the precipitate from the solution, and calcining the precipitate.

CARL RAYMOND WHITTEMORE.